United States Patent [19]
Stevens et al.

[11] Patent Number: 5,787,775
[45] Date of Patent: Aug. 4, 1998

[54] MULTIDIRECTIONAL CUTTING TOOL IN A PUNCH PRESS ENVIRONMENT

[75] Inventors: Clifford Frank Stevens, Hoffman Estates; Mikko Lindstrom, Streamwood, both of Ill.

[73] Assignee: Finn-Power International, Inc., Schaumburg, Ill.

[21] Appl. No.: 225,062

[22] Filed: Apr. 8, 1994

[51] Int. Cl.⁶ .................................................. B26D 5/08
[52] U.S. Cl. .................................... 83/34; 83/76.1; 83/405; 83/552; 83/508; 83/685
[58] Field of Search .......................... 83/34, 76.1, 405, 83/552, 426, 508, 684, 683, 349, 559, 560, 561, 562

[56] References Cited

U.S. PATENT DOCUMENTS

| | | |
|---|---|---|
| 362,621 | 5/1887 | Heiss ............................. 83/508 |
| 997,696 | 7/1911 | Passler ........................... 83/508 |
| 3,949,635 | 4/1976 | Daniels . |
| 3,964,355 | 6/1976 | Daniels . |
| 3,979,984 | 9/1976 | Daniels . |
| 4,004,333 | 1/1977 | Daniels . |
| 4,343,210 | 8/1982 | Kuroyone . |
| 4,519,285 | 5/1985 | Dontscheff ...................... 83/508 |
| 4,555,967 | 12/1985 | Jumel ............................. 83/559 |
| 4,665,787 | 5/1987 | Arnold et al. ................... 83/508 |
| 4,804,428 | 2/1989 | Held .............................. 83/508 |
| 5,259,100 | 11/1993 | Takahashi ....................... 83/552 |

*Primary Examiner*—Maurina T. Rachuba

[57] ABSTRACT

To adapt a punch press to cut work blanks, a cutting mechanism having a freely rotating cutting wheel is provided to a first support of the punch press while a corresponding die having a groove for mating with the cutting wheel is provided to a second support of the punch press. To operate, the cutting wheel is moved toward the die a given distance such that the cutting edge of the cutting wheel slidably mates with the cutting edge of the groove of the die to effect cutting of the workpiece. By synchronously rotating both the cutting wheel and the die to different orientations while maintaining their respective cutting edges aligned and in sliding contact with each other, by moving a worksheet relative to the cutter wheel and die, a multidirectional cut path may be effected on the worksheet.

36 Claims, 3 Drawing Sheets

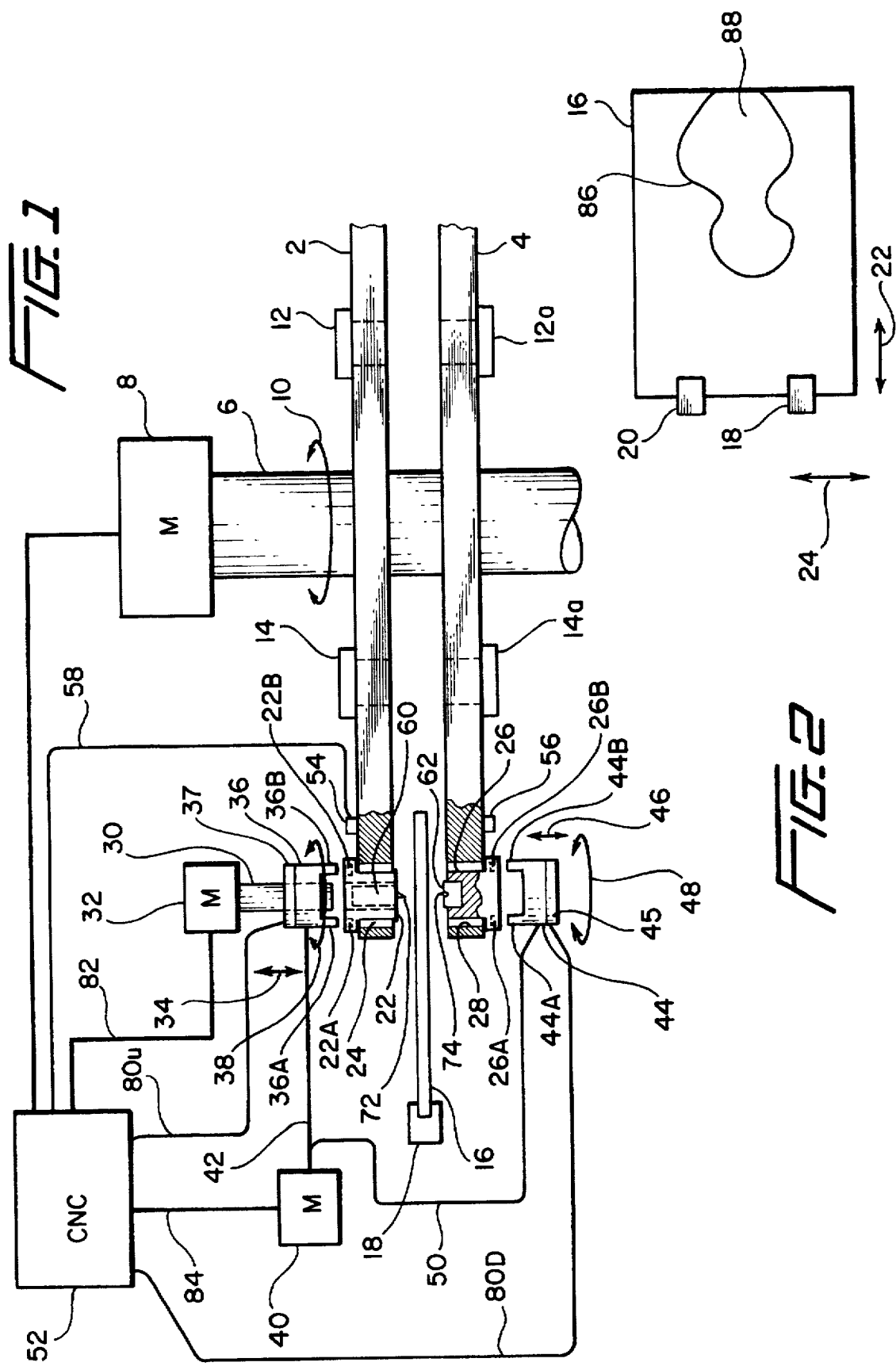

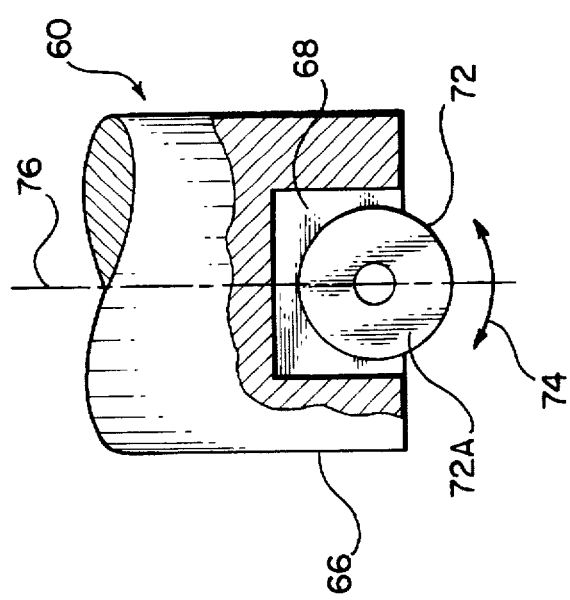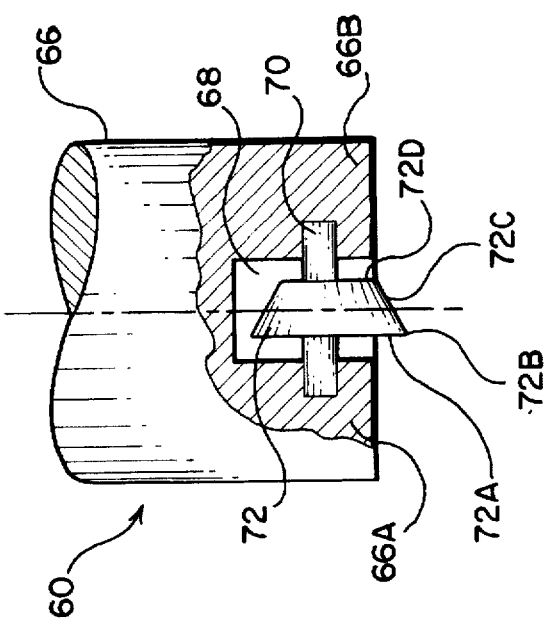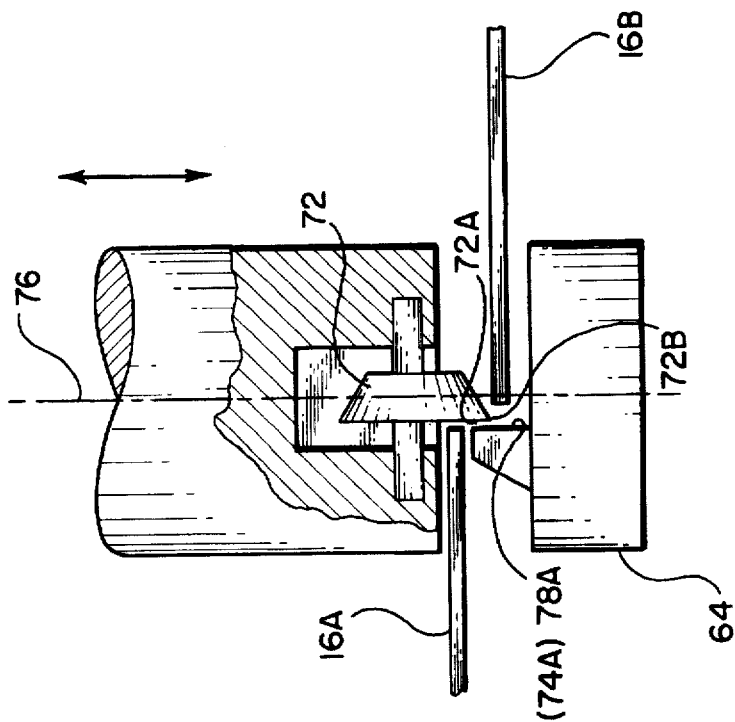

MULTIDIRECTIONAL CUTTING TOOL IN A PUNCH PRESS ENVIRONMENT

FIELD OF THE INVENTION

The present invention relates to punch presses and more particularly to a punch press equipped with a cutter mechanism for cutting, as well as punching, workpieces.

BACKGROUND OF THE INVENTION

Presently, to cut a workpiece or work blank in a punch press environment, a right angle shear is used. However, right angle shears only cut a workpiece in a straight edge fashion, that is, only square or rectangular sheets may be cut from the work blank. Thus, in order to produce an irregularly shaped or contoured piece from the work blank, more often than not a nibbling tool is used. In essence, nibbling of the workpiece takes place when a small diameter punch is used to punch a number of contiguous holes on the workpiece until the irregularly shaped sheet is produced. It therefore requires a large number of punching. In place of a nibbling tool, another method in which a workpiece may be cut in a punch press environment is by means of a laser cutter, as for example disclosed in U.S. Pat. RE 31,042. Yet another method in which a workpiece may be cut in a punch press environment is by means of plasma. Yet a furthermore method is taught in related U.S. Pat. Nos. 3,964,355, 3,949,635, 3,979,984, and 4,004,333. There, a band saw with rotary guides is disclosed.

With every one of the above mentioned prior art methods of cutting in a punch press environment, problems exist. For example, for the band saw type cutting, the cut produced is as wide as the width of the band saw. In addition, the cut can only start at an edge of a work blank since the band saw blade extends between the rotary guides. Putting it differently, to start a cut anywhere on a work blank away from its edges is impossible. Furthermore, loose and potentially dangerous materials such as chips, scraps or metallic saw dust are produced as the workpiece is cut. The same loose material problem applies to the nibbling tool in which small scraps of metal are produced as a result of the workpiece being punched numerous times. Grooves are also produced with the band saw and the nibbling methods. Oftentimes, these grooves have to be removed, thereby entailing additional work, loss of material and possibly the production of a contoured sheet that is not of the requisite dimension. Moreover, the laser and plasma cut methods require that an expensive laser cutter or plasma cutter be purchased and installed to the punch press. In the instance where a laser or plasma cutter is used, in addition to causing a groove, heat infected zones also are produced at the cut edge of the cut sheet. These heat infected zones result from the melting and then cooling of the material along the cut path, and are unacceptable for numerous applications such as for example plates for aircraft.

SUMMARY OF THE INVENTION

To provide an economic way of cutting a workpiece in a punch press environment, a conventional auto-index tool station of the punch press is replaced with a cutting mechanism which can be rotated to different orientations for cutting a contoured sheet from a workpiece. In particular, the cutting mechanism comprises an upper tool and a lower die which together form an auto-index cutting station, which uses, instead of a punch, a free turning cutting wheel. This cutting wheel is rotatably mounted to be the upper tool of the punch press. The corresponding die, which has a groove portion for mating with the cutter wheel, is rotatably mounted as the lower tool. To cut a workpiece, provided that the cutting edge of the cutting wheel is aligned with the cutting edge of the groove, the cutting wheel is pressed toward the groove of the die, for example by a hydraulic ram, until the cutting edge of the cutting wheel slidably mates with the cutting edge of the groove. The depth at which the cutting wheel is pressed toward the die is dependent on the thickness of the sheet material to be cut. Thus, to cut a contour from a workpiece, both the upper and lower tools are rotated synchronously as the workpiece is moved relative to the cutting wheel which, together with the die, effect a multidirectional cut path on the workpiece.

Insofar as an auto-index tool station can be readily replaced by the present invention cutting station, any punch press that has auto-index tool stations can easily be retrofitted with the present invention auto-index cutting station. Therefore, the present invention cutting station is quite economical.

It is therefore an objective of the present invention to provide an economical alternative cutting mechanism for cutting irregularly shaped configurations on a workpiece in a punch press environment.

It is another objective of the present invention to provide a punch press that is capable of cutting a multidirectional cut path on a workpiece without resorting to either nibbling, laser cutting, plasma cutting or band sawing.

It is yet another objective of the present invention to provide a punch press cutting station that, when cutting, does not produce scraps, chips, slivers or saw dust.

It is yet a further objective of the present invention to provide a punch press that is capable of cutting an irregularly shaped sheet from a workpiece whose dimension does not have to take into consideration grooves and/or lost material resulting from the conventional type of cutting in a punch press environment.

It is still a further objective of the present invention auto-index cutting station to produce cut sheets that do not have heat damaged edges.

BRIEF DESCRIPTION OF THE FIGURES

The above-mentioned objectives and advantages of the present invention will become apparent and the invention itself best understood by reference to the following description of an embodiment of the invention taken into conjunction with the accompanying drawings, wherein:

FIG. 1 is a simplified schematic of the present invention cutting station shown to be operating in a turret punch press environment;

FIG. 2 is plan view of a worksheet cut by the cutting station of the instant invention;

FIG. 3A is a semi-exposed side view of the cutting tool of the cutting station of the present invention;

FIG. 3B is a semi-exposed view of the cutting tool shown in FIG. 3A with the cutting wheel being shown frontally;

FIG. 6 is a semi-exposed front view illustrating the cooperation between the cutting wheel and the cutting die of the present invention cutting station.

DETAILED DESCRIPTION OF THE PRESENT INVENTION

Figure 5A:
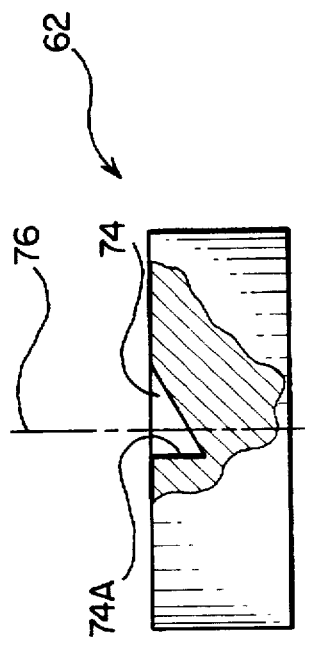
FIG. 5A is a semi-exposed front view of another cutting die of the present invention cutting station.

FIG. 1 is a simplified illustration of the essential components of the present invention work station shown to be operating in a punch press environment, and more specifically in a turret punch press environment, such as for example a Finn-Power TP Series turret punch press. In particular, as shown, the present invention turret punch press has an upper turret 2 and a lower turret 4 each rotatably mounted about a central shaft 6, which is driven by a motor 8. Thus, when motor 8 is activated, turrets 2 and 4 may be rotated bidirectionally per rotational arrow 10. Mounted to upper turret 2 are a number of tools, for example 12 and 14. These upper tools in turn are positioned opposite a corresponding number of dies, such as 12a and 14a, mounted to lower turret 4. The rotation of turrets 2 and 4, as well as the mounting of a plurality of punching tools—be they regular punches, Multitool or auto-index punch tools—are conventional and are meant to punch holes in a work blank or worksheet such as for example workpiece 16.

As is well known, workpiece 16 is held and maneuvered by multiple clamps, such as for example clamps 18 and 20. See FIG. 2. The positioning, or rather moving, of workpiece 16 in both the X and Y directions, as represented by bidirectional arrows 22 and 24, respectively, is done by clamp holders 18 and 20 (along the Y axis as shown in FIG. 2) and by a carriage (not shown) along the X axis represented by bidirectional arrow 22. The operation of clamps 18 and 20 and the movement of a workpiece such as 16 is conventional and is disclosed, for example, in U.S. Pat. No. 4,658,682 assigned to the same assignee as the instant invention and whose disclosure is incorporated by reference herein.

It should be noted that even though the present invention cutting station is disclosed and illustrated as operating in a turret punch press, it in actuality is not limited to just being used in the turret punch press environment. For example, the present invention cutting station is equally operable in a punch press environment in which there are no turrets, as for example in a punch press where the upper tool is mounted to be an extension of the punching ram, or in an environment where a matrix of a plurality of positionally fixed tools and their respective dies are driven by a corresponding matrix of a plurality of driving rams. In other words, instead of having upper and lower turrets synchronously rotated to place the desired tool and die in the punching position, the portion of the sheet that is to be punched is maneuvered to be between the desired pair of punch and tool for punching. There are often fitted to these types of punch presses at least one so-called auto-index punching station in which a punch, and its corresponding die, could be synchronously rotated so that holes of different orientations may be punched on a worksheet. Such auto-index punch stations may in fact be added as an option to the above noted Finn-Power TP Series turret punch presses.

Refer to FIG. 1. As illustrated by the pertinent portion of one of the above-noted Finn-Power turret punches, each auto-index station fitted to such exemplar turret punch press is made up of an upper tool 22 rotatably fitted to an aperture 24 formed at upper turret 2 and a lower tool 26 likewise rotatably fitted to an aperture 28 formed at lower turret 4. As shown, the rotatable upper tool 22 and lower tool 26 are rotated by motor 8 to be in alignment with a punching ram 30. For the exemplar turret punch press of FIG. 1, tools 22 and 26 could be considered to comprise an upper tool portion or holder for accepting a tool and a lower tool portion or holder for accepting a die.

Of course, for punch presses that do not have turrets, upper tool and lower die which functionally are similar to upper tool 22 and lower tool 26, respectively, are used instead. As was mentioned previously, corresponding pairs of such upper tool and lower die may be fixed positionally in a punch press so as to be cooperatively driven by a corresponding number of rams. Alternatively, in the case where there is only one auto-index punch station, the upper tool may be coupled directly to the ram while the die is positioned opposite thereto to receive and mate with the tool.

Return to the exemplar FIG. 1 embodiment. Ram 30 is connected to and driven by a driving motor 32 so as to be movable bidirectionally as indicated by bidirectional arrow 34. Fitted about ram 30 is an upper rotator mechanism 36 for rotating upper tool 22 per rotational arrow 38. As shown, upper rotator mechanism 36 has two extensions 36a and 36b facing notches 22a and 22b, respectively, formed at the top portion of upper tool 22. Although shown as being disengaged from tool 22, upper rotator mechanism 36 is movable toward tool 22 to matingly couple extensions 36a and 36b to notches 22a and 22b, respectively. Thus coupled, upper rotator mechanism 36 may be driven incrementally and bidirectionally per bidirectional arrow 38 by a servomotor 40 via some conventional clutch and gear mechanism, represented by line 42, to rotate tool 22. To move rotator mechanism 36 toward upper tool 22, a mechanism 37, which is capable of moving rotator mechanism 36 bidirectionally per bidirectional arrow 34, is used. Driving mechanisms 37 may be a conventional hydraulic cylinder which is capable of pushing and pulling rotator mechanism 36 to and from tool holder 22.

As discussed above, lower tool 26 is rotatably fitted to aperture 28 at lower turret 4. Positioned underneath tool 26 is a lower rotator mechanism 44 which, like upper rotator mechanism 36, is movable bidirectionally, per bidirectional arrow 46, by a lower driving mechanism 45. Extending from lower rotator mechanism 44 are extensions 44a and 44b facing notches 26a and 26b, respectively, formed at the lower portion of lower tool or die 26. Thus, lower rotator mechanism 44 may be moved toward lower tool 26 to mate extensions 44a and 44b to notches 26a and 26b, respectively. Like the rotation of upper rotator 36, the rotation of lower rotator mechanism 44, as represented by rotational arrow 48, is done by means of clutch and gear means represented by line 50, which is also connected to servomotor 40. Thus, once upper rotator mechanism 36 and lower rotator mechanism 44 are respectively engaged to upper tool 22 and lower tool 26, servo motor 40, upon activation by processor controller (CNC) 52, can synchronously rotate both upper tool 22 and lower tool 26. A detailed disclosure of a variant auto-index punch tool is disclosed in U.S. Pat. No. 4,343,210 whose disclosure is incorporated herein by reference.

The alignment of upper tool 22 and lower tool 26 may be achieved by manually turning the respective tools to corresponding predetermined locations each being identified for example by an indentation formed at a location on the turret about which the tool rotates. Such alignment method is done in the aforenoted Finn-Power TP Series turret punch presses. An alternative method of ascertaining the alignment positions of the upper and lower tools, as disclosed in the aforenoted '210 patent, is by using sensors exemplified for example in FIG. 1 by 54 and 56, which separately send a detection signal to controller 52 to inform the same that the tools are in their respective alignment positions. For the sake of clarity, only one signal line, represented by line 58, is shown to connect detector 54 to controller 52. No such connection is shown between the lower detector 56 and controller 52.

Figure 5B:
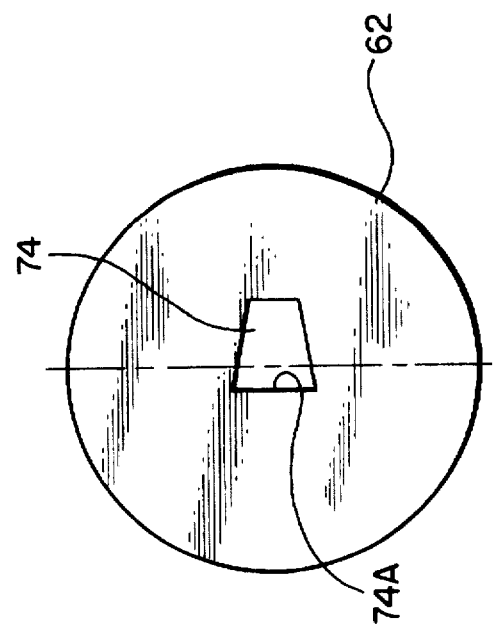
FIG. 5B is a plan view of the FIG. 5A cutting die.

For the instant invention, in contrast to a conventional auto-index station where a punch tool is located at upper tool 22 and a die to lower tool 26, a cutting wheel tool 60 such as that shown in FIGS. 3A and 3B is used instead as tool 22 while a die 62 such as that shown in FIGS. 5A and 5B (or a die 64 such as that shown in FIGS. 4A and 4B) is used as lower tool 26.

As shown in FIGS. 3A and 3B, cutter wheel tool 60 has a main body portion 66 whose lower end has a cavity 68. As best shown in FIG. 3A, fitted to leg portions 66a and 66b is a shaft 70 about which a freely rotating cutter wheel 72 is mounted. Although not shown, mounted about shaft 70 are bearings or other rolling means of enhancing the rotational movement of wheel 72, as represented by rotational arrow 74. As further shown, cutter wheel 70 has a flat surface or cutting edge 72a which extends to a cutting apex 72b before slanting upwards per slant 72c to a back surface 72d.

Figure 4A:
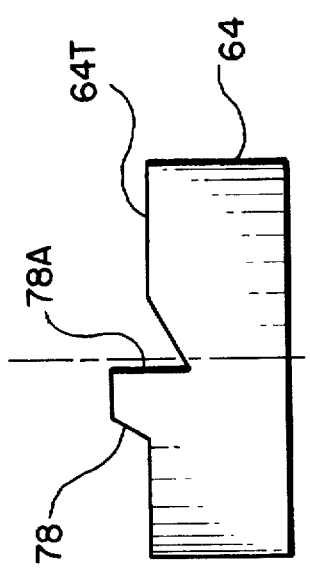
FIG. 4A is a front view of a cutting die of the cutting station of the present invention.
Figure 4B:
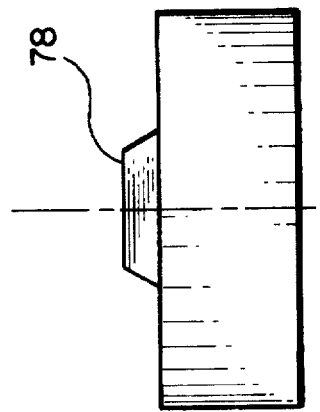
FIG. 4B is a side view of the FIG. 4A cutting die.

Lower tool 26, as was mentioned previously, is a die having a first embodiment 62 shown in FIGS. 5A and 5B. As shown in FIG. 5A, die 62 has a groove 74 having a cutting surface or cutting edge 74a, which is somewhat offset from longitudinal axis 76, so as to slidably mate with cutting apex 72b and then cutting edge 72a of cutter wheel 72. FIGS. 4A and 4B illustrate a variant of the die shown in FIGS. 5A and 5B. For this variant die 64, instead of a groove, a bump 78 (separately drawn in both FIGS. 4 and 6 for illustration purpose) extends from top surface 64t of die 64. Bump 78 has a cutting edge 78a which, like cutting edge 74a of die 62, slidably mates with apex 72b and then cutting edge 72a of cutter wheel 72 for effecting cutting of a workpiece, as discussed hereinbelow with reference to the operation of the present invention cutter mechanism.

In particular, with reference to FIGS. 1 and 6, upon placing workpiece 16 between upper tool 22 and lower tool 26 and having aligned the respectively tools to accept the extensions (36a, 36b and 44a, 44b) of rotator mechanisms 36 and 44, CNC 52 sends a signal via leads 80U and 80D to upper driving mechanism 37 and lower driving mechanism 45, respectively. Thereafter, upper rotator mechanism 36 is pushed toward upper tool 22 to mate extensions 36a and 36b of rotator mechanism 36 with notches 22a and 22b, respectively, of upper tool 22. Likewise, lower driving mechanism 45, upon receipt of signal from CNC 52, pushes lower rotator mechanism 44 toward lower tool 26 such that extensions 44a and 44b thereof mate with notches 26a and 26b, respectively, of lower tool holder 26. As shown, upper tool 22 comprises cutter wheel tool 60 while lower tool 26 comprises die 62. Upon engagement of upper rotator mechanism 36 to upper tool 22 and lower rotator mechanism 44 to lower tool 26, a signal is provided by CNC 52, via line 82, to driving motor 32 to drive ram 30 toward upper tool 22 and more specifically to drive cutter tool 60 matingly downwards toward die 62.

So far in the description of the invention, tools 22 and 26 have been considered as unitary tools. This is the case for a number of auto-index stations for various manufacturers. However, for the exemplar punch press shown in FIG. 1, each of tools 22 and 26, in actuality, comprises a tool holder to which the appropriate tool is fitted. To elaborate, for the FIG. 1 embodiment, fitted to upper tool holder of tool 22 is the cutter tool 60 shown in FIGS. 3A and 3B. Similarly, fitted to the tool holder of lower tool 26 is the corresponding die 62 of FIGS. 5A and 5B. For the remainder of this description, for the sake of consistency, with respect to the exemplar embodiment of FIG. 1, upper tool 22 is considered to comprise a tool holder and the cutter tool fitted thereinto, while lower tool 26 is considered to comprise a lower tool holder having fitted thereinto a corresponding die. Thus, in the instance where the upper tool is being driven by a ram such as 30, it should be appreciated that it is the actual tool such as cutter tool 60 that is being driven while the tool holder remains relatively and rotatably fixed to the upper turret 2 and not affected by the movement of ram 30.

Although shown as being positioned equal distance from upper turret 2 and lower turret 4, it should be appreciated that workpiece 16, in reality, is substantially resting on the surface of a worktable which is substantially coplanar with the top of die 62. Thus, motor 32 would drive ram 30 downwards for driving cutter tool 60 toward die 62. And depending on the distance separating the bottom surface of the holder of tool 22 and the top surface of the holder of lower tool 26, ram 30 may be driven to different depths to ensure that cutting edge or surface 72a of rotating cutter 72 comes into contact with cutting edge or surface 78a (74a) of die 64 (62). Although not shown to be in contact with each other in FIG. 6, in practice, surface 72a slides against surface 78a to thereby cut workpiece 16 into sections 16a and 16b, as exaggeratedly shown being separated in FIG. 6. Therefore, the cutter mechanism of the present invention, in essence, operates like a pair of scissors in that a first cutting edge such as surface 72a of cutter wheel 72 slides against a second cutting edge such as surface 74a of die 62 to thereby effect cutting on a workpiece.

It should be noted that albeit die 64 of FIGS. 4A and 4B is shown to be used in FIG. 6, in practice, die 62 is preferably used inasmuch as its top surface 62 is more coplanar with the surface of the worktable onto which workpiece 16 is placed and moved. To enhance the movement of the workpiece on the worktable—which is effected by the combination of clamps 18, 20 and carriage (not shown)—rollers and/or small ball bearings (not shown) may be fitted to the tabletop of the worktable. Alternatively, a low coefficient of friction material such as PVC or teflon may be used for the table surface upon which workpiece 16 is placed.

Refer now to FIG. 2. Given the fact that workpiece 16 is moveable relative to cutter tool 60 and die 62, to cut a contoured sheet from workpiece 16, signals are provided from CNC 52 to servomotor 40 via line 84 to synchronously rotate upper tool 22 and lower tool 26 via upper rotator mechanism 36 and lower rotator mechanism 44, respectively. Accordingly, the cutting edges 72a and 74a (78a) are simultaneously rotated to the different orientations as workpiece 16 is moved to different X and Y coordinates. Thus, a multidirectional cut path such as 86 shown on worksheet 16 of FIG. 2 may be effected for cutting out an irregularly shaped sheet 88 from workpiece 16.

Inasmuch as a plurality of punching tools and their corresponding dies are also mounted to turrets 2 and 4, respectively, of the exemplar embodiment of FIG. 1, in addition to contours being effected on sheet 16, holes may also be punched thereon by rotating turrets 2 and 4 to position the appropriate punch tool and die in alignment with ram 30. Moreover, since cutter wheel 72 is a free rolling wheel having a cutting point 72b which is sharply defined, as workpiece 16 is cut by cutter wheel 72 (as it presses against the sheet and slides against cutting edge 74a or 78a of the appropriate die), no scraps, chips, slivers or saw dust are produced. And insofar as the cut is sharply defined, no grooves are formed. Moreover, no defective heat zones are formed at the cut edge since no heat is used for the cutting. Furthermore, since the cutting mechanism can be readily fitted to an existing auto-index station, it is extremely economical when compared to existing cutting devices, such as those mentioned earlier in a punch press environment.

When the cut is finished, a signal is sent from CNC 52 to motor 32 for retracting ram 30 away from cutter tool 60, which accordingly moves upwards away from die 62 due to a compression spring (not shown) in the holder of tool 22. Thereafter, depending on whether or not a second workpiece is to be cut, the rotator mechanisms 36 and 44 can either be maintained in engagement with the respective tools or can be pulled back by motors 37 and 44.

While a preferred embodiment of the present invention is disclosed herein for purposes of explanation, numerous changes, modifications, variations, substitutions and equivalents in whole or in part, should now be apparent to those skilled in the art to which the invention pertains. Accordingly, it is intended that invention be limited only by the spirit and scope of the appended claims.

We claim:

1. In a work station having at least one workpiece to be worked on being positioned relative to said work station, an apparatus for cutting said workpiece comprising:
   at least one cutting means rotatably and movably mounted to a first support at said work station;
   at least one die means for mating with said cutting means rotatably mounted to a second support opposed to said first support at said work station;
   means for moving said cutting means and said die means matingly toward each other and maintaining said cutting means and said die means in relative mated position with each other to cut said workpiece; and
   means for synchronously rotating said matingly maintained cutting means and die means so that a continuous cut of different orientations on said workpiece may be effected.

2. Apparatus of claim 1, wherein said cutting means comprises:
   a cutting wheel having a cutting edge rotatable orthogonally to the plane of said workpiece movably coupled to said first support, said cutting wheel rotatable in parallel to the plane of said workpiece;
   wherein said die means comprises:
   a die rotatable in parallel to the plane of said workpiece having a cutting edge for slidably cooperating with the cutting edge of said cutting wheel to effect cutting.

3. Apparatus of claim 2, wherein said rotating means comprises:
   at least one servomotor for simultaneously rotating said cutting means and die means.

4. Apparatus of claim 1, wherein said moving means comprises:
   a ram for vertically driving said cutting means to mate with said die means.

5. Apparatus of claim 1, further comprising:
   means for positioning said workpiece relative to said cutting means and said die means as said cutting means and said die means are being synchronously rotated to different orientations.

6. Apparatus of claim 1, further comprising:
   processor means for controlling the synchronous rotation of said cutting means and said die means, and the distance said cutting means and said die means are driven relative toward each other by said moving means.

7. Apparatus of claim 1, further comprising:
   means for producing at least one signal to indicate said cutting means and said die means being in alignment with each other so that said moving means may be activated.

8. A turret punch press having rotatable first and second turrets and adaptable to cut workpieces, comprising:
   at least one first cutting means rotatably mounted to said first turret;
   at least one second cutting means for mating with said first cutting means rotatably mounted to said second turret;
   means for driving said first cutting means to mate with said second cutting means and to maintain said first and second cutting means in relative mated position with each other to cut a workpiece placed between said first and second cutting means; and
   means for synchronously rotating said first and second cutting means to different orientations so that a continuous multidirectional cut may be effected on said workpiece by said first and second cutting means in said relative mated position.

9. A turret punch press having rotatable first and second turrets and adaptable to cut workpieces, comprising:
   at least one first cutting means rotatably mounted to said first turret;
   at least one second cutting means for mating with said first cutting means rotatably mounted to said second turret;
   means for driving said first cutting means to mate with said second cutting means and to maintain said first and second cutting means in relative mated position with each other to cut a workpiece placed between said first and second cutting means; and
   means for synchronously rotating said first and second cutting means to different orientations so that a continuous multidirectional cut may be effected on said workpiece by said first and second cutting means in said relative mated position;
   wherein said first cutting means comprises
   a cutting wheel having a cutting edge rotatable orthogonally to the plane of said workpiece;
   wherein said second cutting means comprises
   a die having a grooved edge for cooperating with said cutting edge of said cutting wheel to effect cutting.

10. Turret punch press of claim 9, wherein said rotating means comprises:
    at least one servomotor for synchronously rotating said cutting wheel and said die.

11. Turret punch press of claim 8, wherein said driving means comprises:
    a ram for vertically driving said first cutting means to mate with said second cutting means.

12. Turret punch press of claim 8, further comprising:
    means for positioning said workpiece relative to said first and second cutting means as said cutting means are being synchronously rotated to different orientations.

13. Turret punch press of claim 8, further comprising:
    processor means for controlling the synchronous rotation of said cutting means, and the distance said cutting means are driven relative toward each other by said driving means.

14. Turret punch press of claim 8, further comprising:
    means for producing at least one signal to indicate said first and second cutting means being in alignment with each other so that said driving means may drive said first cutting means toward said second cutting means.

15. Turret punch press of claim 8, further comprising:
    at least one punch mounted to said first turret;
    at least one die for mating with said punch mounted to said second turret;

wherein said driving means is adaptable to drive said punch toward said die for punching a hole in a workpiece placed therebetween after said first and second turrets have been rotated to position said punch and die in alignment with said driving means such that both multidirectional cut paths and holes may be effected on workpieces by said turret punch press.

16. A turret punch press having at least one punch tool and one corresponding die for punching holes in workpieces, comprising:

at least one first blade means having a cut edge rotatably mounted to a first support to which either one of said punch tool and die is mounted at a work station;

at least one second blade means having a cut edge for slidably mating with the cut edge of said first blade means rotatably mounted to as second support opposing said first support at said work station to which the other of said punch tool and die is mounted;

means for driving said first blade means toward said second blade means such that the respective cut edges of said first and second blade means slide pass each other to cut a workpiece placed between said first and second blade means; and means for synchronously rotating said first sand second blade means to different orientations so that a continuous multidirectional cut may be effected on said workpiece.

17. Punch press of claim 16, wherein said first blade means comprises:

a cutting wheel mechanism whose cut edge being rotatable orthogonally to the plane of said workpiece; and wherein said second blade means comprises:

a die mechanism whose cut edge slidably cooperates with the cut edge of said cutting wheel mechanism to effect cutting on said workpiece.

18. Punch press of claim 16, wherein said rotating means comprises:

at least one servomotor for synchronously rotating said first and second blade means to maintain the respective cut edges of said first and second blade means in alignment with each other.

19. Punch press of claim 16, wherein said driving means comprises:

a ram for vertically driving the cut edge of said first blade means to slide pass the cut edge of said second blade means.

20. Punch press of claim 16, further comprising:

means for positioning said workpiece relative to said first and second blade means.

21. Punch press of claim 16, further comprising:

numerical control means for controlling said rotating means to synchronously rotate said first and second blade means, and said driving means to drive said first blade means a sufficient distance so that the cut edge thereof slides pass the cut edge of said second blade means to cut said workpiece.

22. Punch press of claim 16, further comprising:

means for producing at least one signal to indicate the respective cut edges of said first and second blade means being in alignment with each other before said driving means may drive said first blade means toward said second blade means.

23. In a turret punch press having at least one punch tool and one corresponding die for punching holes in workpieces, a method of effecting cuts on said workpieces, comprising the steps of:

(a) rotatably mounting to a first support of said punch press to which said one punch tool is mounted at least one first blade means having a cut edge;

(b) rotatably mounting to a second support of said punch press opposed to said first support to which said corresponding die is mounted at least one second blade means having a cut edge for slidably mating with the cut edge of said first blade means;

(c) driving said first blade means toward said second blade means such that the respective cut edges of said first and second blade means slide pass each other to cut a workpiece placed between said first and second blade means; and (d) synchronously rotating said first and second blade means to different orientations so that a continuous multidirectional cut may be effected on said workpiece.

24. Method of claim 23, wherein said step (a) further comprises the step of:

rotatably mounting to said first support a cutting wheel mechanism whose cut edge being rotatable orthogonally to the plane of said workpiece; and wherein said step (b) further comprises the step of:

rotatably mounting to said second support a die mechanism whose cut edge slidably cooperates with the cut edge of said cutting wheel mechanism to effect cutting on said workpiece.

25. Method of claim 23, wherein said step (d) further comprises the step of:

utilizing at least one servomotor for synchronously rotating said first and second blade means to maintain the respective cut edges of said first and second blade means in alignment with each other.

26. Method of claim 23, wherein said step (d) further comprises the step of:

utilizing a ram for vertically driving the cut edge of said first blade means to slide pass the cut edge of said second blade means.

27. Method of claim 23, further comprising the step of:

positioning said workpiece relative to said first and second blade means during step (d).

28. Method of claim 23, further comprising the step of:

numerically controlling the synchronous rotation of said first and second blade means, and the driving of said first blade means to cause the cut edge thereof to slide sufficiently pass the cut edge of said second blade means to cut said workpiece.

29. Method of claim 23, further comprising the step of:

monitoring the respective orientation positions of said first and second blade means to produce at least one signal to indicate the respective cut edges of said first and second blade means being in alignment with each other before driving said first blade means toward said second blade means.

30. In a work station having a first support and a second support between which at least one workpiece to be worked on is positioned, a method of cutting said workpiece comprising the steps of:

(a) rotatably mounting to one of said supports at least one cutting means;

(b) rotatably mounting to the other of said supports at least one die means for mating with said cutting means;

(c) moving and maintaining said cutting means and said die means matingly relative toward each other to cut said workpiece; and (d) synchronously rotating said matingly maintained cutting and die means so that a continuous cut of different orientations on said workpiece may be effected.

31. Method of claim 30, wherein said step (a) further comprises the step of:

rotatably coupling to said one support a cutting wheel having a cutting edge rotatable orthogonally to the plane of said workpiece; and wherein said step (b) further comprises the step of:

rotatably coupling a die having a cutting edge for slidably cooperating with the cutting edge of said cutting wheel to effect cutting to said other support.

32. Method of claim 31, wherein said step (d) further comprises the step of:

utilizing at least one servomotor for simultaneously rotating said cutting wheel and said die.

33. Method of claim 30, wherein said step (d) further comprises the step of:

utilizing a ram for vertically driving said cutting means to mate with said die means.

34. Method of claim 30, further comprising the step of:

positioning said workpiece relative to said cutting means and said die means as said cutting means and said die means are being synchronously rotated to different orientations.

35. Method of claim 30, further comprising the step of:

computer controlling the synchronous rotation of said cutting means and said die means, and the distance said cutting means and said die means are being driven relative toward each other by said moving means.

36. Method of claim 30, further comprising the steps of:

monitoring the respective orientations of said cutting means and said die means with respect to corresponding predetermined alignment check points;

producing at least one signal to indicate said cutting means and said die means being in alignment with each other before activating said moving means.

* * * * *